(12) United States Patent
Zack et al.

(10) Patent No.: US 8,641,345 B2
(45) Date of Patent: Feb. 4, 2014

(54) SCREW COVER AND SEAL

(76) Inventors: Gary Zack, Pembroke Park, FL (US);
Robert R. Laviolette, Pembroke Park, FL (US)

(*) Notice: Subject to any disclaimer, the term of this patent is extended or adjusted under 35 U.S.C. 154(b) by 91 days.

(21) Appl. No.: 13/331,535

(22) Filed: Dec. 20, 2011

(65) Prior Publication Data
US 2012/0155989 A1 Jun. 21, 2012

Related U.S. Application Data

(60) Provisional application No. 61/459,893, filed on Dec. 20, 2010.

(51) Int. Cl.
*F16B 37/14* (2006.01)
(52) U.S. Cl.
CPC .................................... *F16B 37/14* (2013.01)
USPC ........................................ 411/377; 411/372.5
(58) Field of Classification Search
USPC ........................................ 411/372.5–373, 377
See application file for complete search history.

(56) References Cited

U.S. PATENT DOCUMENTS

| | | | | |
|---|---|---|---|---|
| 2,710,113 A | * | 6/1955 | Pritchard | 220/681 |
| 3,470,787 A | * | 10/1969 | Mackie | 411/377 |
| 4,519,974 A | * | 5/1985 | Bravenec et al. | 264/279 |
| 4,686,808 A | * | 8/1987 | Triplett | 52/410 |
| 4,826,380 A | * | 5/1989 | Henry | 411/377 |
| 4,923,348 A | | 5/1990 | Carlozzo et al. | |
| 5,338,141 A | | 8/1994 | Hulsey | |
| 5,419,666 A | | 5/1995 | Best | |
| 5,997,229 A | | 12/1999 | Akers | |

* cited by examiner

*Primary Examiner* — Flemming Saether
(74) *Attorney, Agent, or Firm* — Robert M. Downey, P.A.

(57) ABSTRACT

A dome-shaped aluminum screw cover is adapted to be placed over the head of a self-tapping concrete screw that is used to fasten a metal structure to concrete on a house or building. A concave inner surface of the screw cover provides a space between the cover and the screw head for receiving a charge of silicone adhesive that bonds the cover to the metal structure and screw head, while also providing a watertight seal around the screw head that minimizes entry of moisture and corrosion of the screw. The screw cover is preferably of the same color as the metal structure so as to reduce its visibility while effectively concealing the unsightly screw head.

3 Claims, 2 Drawing Sheets

SCREW COVER AND SEAL

This non-provisional patent application is based on provisional patent application Ser. No. 61/459,893 filed on Dec. 20, 2010.

BACKGROUND

Some embodiments may relate to screw covers for covering the head of a screw and, more particularly, to a dome shaped aluminum cover that is bonded over the head of a self-tapping concrete screw on the exterior surface of a metal structure in order to conceal the screw head while providing a watertight seal around the screw head.

Self-tapping concrete screws are typically used for mounting metal structures to concrete walls and decks of building structures. Commonly known as TAPCON screws, the self-tapping concrete screws are usually painted a distinct color, such as blue, and have a tapered head for flush mount within a countersunk bore. Examples of aluminum and other metal structures that may be mounted to concrete surfaces using self-tapping concrete screws include, but are not limited to window and door frames and tracks, as well as hurricane shutter tracks. Often, the metal structures have pre-drilled holes with countersunk bores surrounding the hole for receiving the self-tapping concrete screws. The frusto conical shape of the screw head seats within the countersunk bore so that the top of the screw head is flush with the exposed surface of the metal structure.

Due to the distinct color of TAPCON screws, the screw heads are easily visible on the exposed surfaces of the metal structures. This tends to present a rather industrial and generally unpleasant appearance, particularly in residential structures such as single family homes and condominium buildings.

A further problem associated with exterior mounting of structures using self-tapping concrete screws is exposure to the elements and penetration of moisture between the screw and metal structure, as well as into the concrete wall or deck of the building. In particular, moisture is able to enter between the screw head and the countersunk bore of the metal structure and along the length of the screw within the concrete structure of the building. Overtime, the screw corrodes and eventually fails. This may result in dislodging of the mounted metal structure. Additionally, entry of moisture within the interior of the concrete can cause structural damage, as well as mold and mildew within the interior of the building structure.

Accordingly, there remains a definite and urgent need for an inexpensive and simple device that can seal the head of TAPCON screws and the surrounding countersunk bore and/or screw hole in mounted metal structures while also concealing the screw head from view. More particularly, there is a need for a simple device that can be quickly and easily installed to conceal the heads of TAPCON screws and blend with the surrounding metal (e.g., aluminum) structures, while providing a water tight seal around the screw head.

While certain aspects of conventional technologies have been discussed and presented to facilitate disclosure of some embodiments, Applicants in no way disclaim these technical aspects, and it is contemplated that the attached claims may encompass one or more of the conventional technical aspects discussed herein.

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is it known to be relevant to an attempt to solve any problem with which this specification is concerned.

SUMMARY

Some embodiments may address one or more of the problems and deficiencies discussed above. However, it is contemplated that some embodiments may prove useful in addressing other problems and deficiencies in a number of technical areas. Therefore the claims should not necessarily be construed as limited to addressing any of the particular problems or deficiencies discussed herein.

Some embodiments may include an aesthetic and waterproof screw cover that has a convex outer surface and an oppositely disposed concave inner surface. In one embodiment, the screw cover is formed of aluminum and is sized and configured to completely cover the head of a self-tapping concrete screw that fastens an aluminum or other metal structure (e.g., aluminum sliding glass door tracks and frames, hurricane shutter frames) to concrete on a house or building. The concave inner surface provides sufficient clearance between the screw cover and the screw head to accommodate a charge of silicone adhesive that bonds the screw cover to the metal structure and screw head. The silicone also serves to seal the screw passage and screw head to protect against moisture entry and corrosion of the screw. In one embodiment, the screw cover is colored to match the metal structure so that the screw cover blends with the metal structure, while concealing the unsightly screw head.

An advantage provided by certain embodiments is the concealing of unsightly screw heads.

These and other advantages of some embodiments are more readily apparent with reference to the detailed description and accompanying drawings.

BRIEF DESCRIPTION OF THE DRAWINGS

For a fuller understanding of the nature of some embodiments, reference should be made to the following detailed description taken in conjunction with the accompanying drawings in which.

Like reference numerals refer to like parts throughout the several views of the drawings.

DETAILED DESCRIPTION OF SOME EMBODIMENTS

Figure 1:
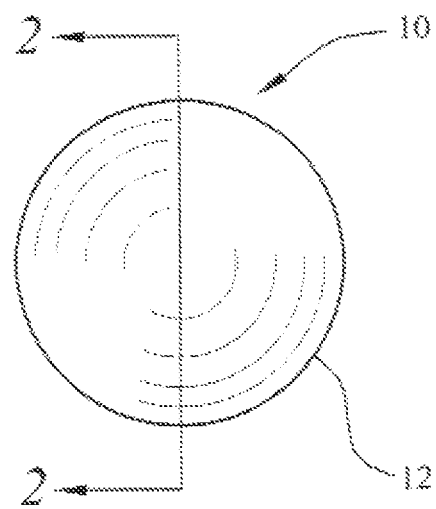
FIG. 1 is a top plan view of the screw cover according to an embodiment.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and do not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

All references herein to any features or elements of some embodiments such as but not limited to "a," "an," "one," "an additional," "another," or "the" feature or element, or grammatical variations thereof, unless otherwise specified by limiting language such as "ONLY ONE . . . " wherein an exact number is specified along with the world "ONLY" or "LIMITED TO", do NOT specifically prevent the inclusion or implementation of more than one of those features or elements, nor do they specifically admit that one or more of those features or elements must be used, unless otherwise specified by the limiting language "MUST have a" or "NEEDS to include one."

All references herein including language such as but not limited to "one or more," "at least one," or grammatical variants thereof are nonlimiting and may be taken to mean that none of a certain feature or element may be used, or alternatively that only a singular feature or element may be used, or alternatively that only a plurality of elements or features may be used, or alternatively that either a singular or a plurality of features or elements may be used, or alternatively that none or one or more than one features or elements may be used. The use of this terminology herein does NOT specifically admit that more than one feature or element has to be used, nor does it specifically admit that only one feature or element has to be used, unless otherwise specified by the limiting language "MUST BE MORE THAN" or "CANNOT BE MORE THAN." Therefore, whether or not a certain feature or element were limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," or variants thereof do NOT necessarily refer to the same embodiments. For example, language such as "some embodiments include a feature" followed by "some embodiments include an element" does NOT necessarily admit that both of the feature and the element are included in all of the same embodiments.

Unless otherwise specified, one or more particular features and/or elements described in connection with one or more embodiments may be found in one embodiment, or may be found in more than one embodiment, or may be found in all embodiments, or may be found in no embodiments.

Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any and all details set forth herein are used in the context of some embodiments and therefore should NOT be necessarily taken as limiting factors to the attached claims. Any descriptions of elements and/or features and/or the materials used to create those elements or features, or examples or methods included in the descriptions of the various embodiments are nonlimiting and are given as an illustration only. Accordingly, the embodiments can be manufactured, distributed, used, practiced, and carried out in numerous ways.

The attached claims and their legal equivalents can be realized in the context of embodiments other than the ones used as illustrative examples in the description herein.

Referring to the several views of the drawings, the screw cover and seal is shown in accordance with some embodiments. In each of these embodiments, the screw cover and seal is generally indicated as 10.

Figure 2:
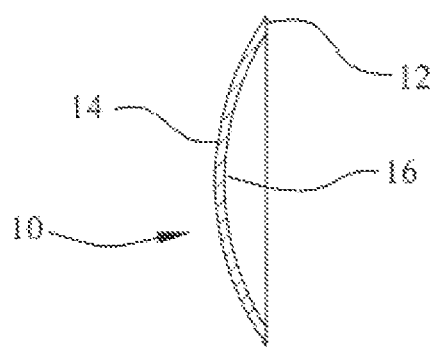
FIG. 2 is a cross-sectional view, taken along the plane of the line indicated by the arrows 2-2 in FIG. 1, illustrating the concave inner surface and convex outer surface of the screw cover.

Reference is now made to FIG. 1 and FIG. 2. In one possible embodiment, the screw cover 10 has a circular configuration about its outer periphery defining a circular edge 12. The screw cover 10 further includes an outer convex surface 14 and an oppositely disposed inner concave surface 16.

Figure 3:
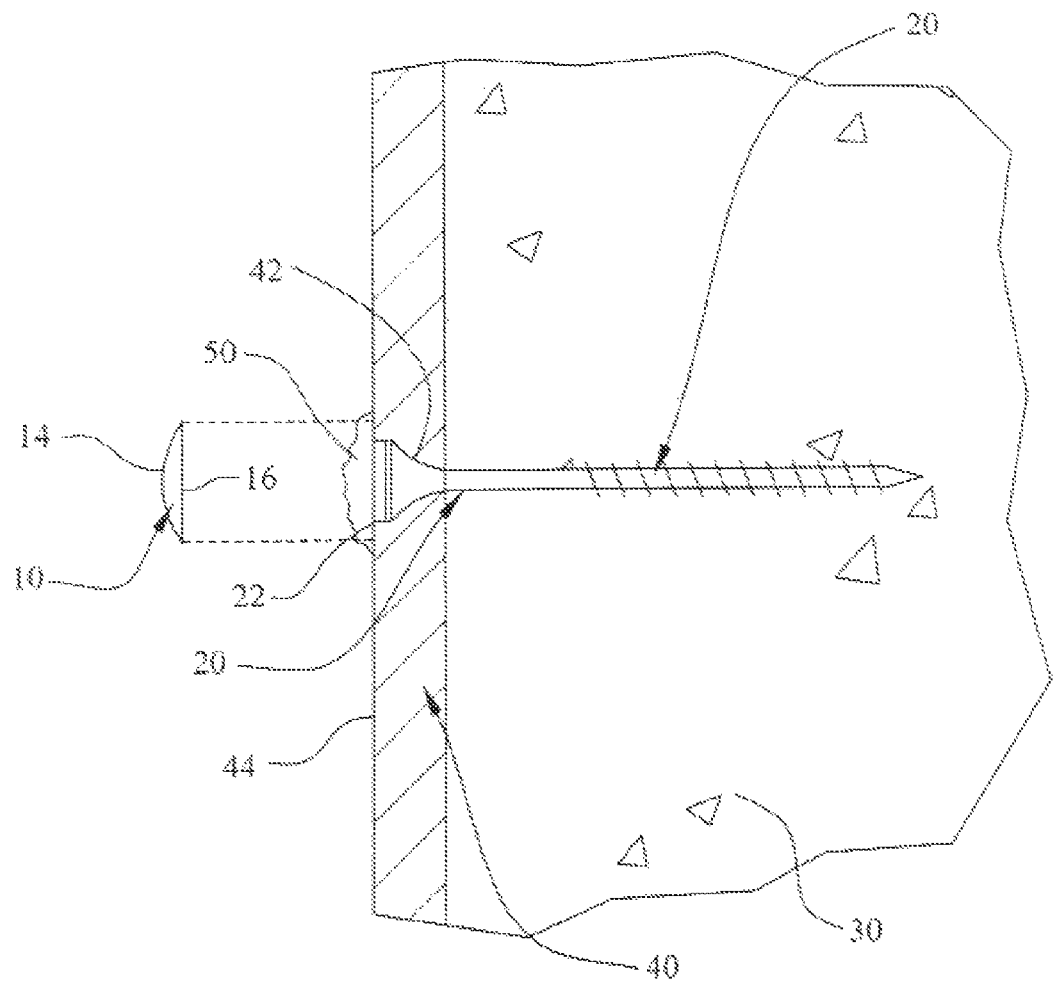
FIG. 3 is a side elevational view, shown in partial cross-section, illustrating attachment of the screw cover over the head of a self-tapping concrete screw on the exterior surface of a metal structure that is fastened to concrete.

Additional reference is now made to FIG. 3. Installation of the screw cover 10 over the head 22 of a self-tapping screw is shown. The screw 20 is fastened into a concrete structure 30 to effectively mount a metal (e.g. aluminum) structure to the concrete. As seen in FIG. 3, the screw head 22 is seated within a countersunk bore 42 of the metal structure 40 so that the top of the screw head 22 is flush with an outer exposed surface 44 of the metal structure.

To install the screw cover 10, the inside concave surface 16 of the screw cover 10, as well as the screw head 22 and surrounding exterior surface 44 of the metal structure is wiped clean with a solvent to remove any dirt or residue. A charge of silicone adhesive 50 is first applied over the screw head and the surrounding exterior surface 44 of the metal structure, adjacent to the screw head 22, to ensure that any gap between the screw head 22 and the metal structure 40, and particularly the countersunk bore 42, is effectively sealed. Next, the aluminum cover 10 is pressed over the screw head 22 and against the charge of silicone adhesive 50, so that the silicone adhesive fills an interior cavity between the screw cover 10 and the exterior surface 44 of the metal structure. The cavity is created by the concave surface 16 of the screw cover 10. The screw cover 10 is pressed against the metal structure until the circular edge 12 of the screw cover 10 engages the exterior surface 44 of the metal structure 40. Any excess silicone adhesive 50 that is squeezed out beyond the circular edge 12 of the screw cover 10 is removed by wiping with a cloth or towel.

Throughout the detailed description and the accompanying drawings enclosed herein, some embodiments have been shown, described and detailed, wherein a variety of possible elements and/or features may be formed and configured in different ways. Accordingly, any and all possible combinations of the elements and/or features described in accordance with these various embodiments may be desirable to manufacturers and/or may help to more successfully meet customers' specific needs and/or preferences. Consequently, any and all possible combinations of the features or elements of one embodiment or more than one embodiment or all embodiments mentioned herein are fully considered within the spirit and scope of the attached claims and their legal equivalents.

Thus, some embodiments of a screw cover and seal have been disclosed. Other embodiments are contemplated and envisioned, and therefore it is recognized that departures from the embodiments described in this disclosure may certainly exist within the spirit and scope of the attached claims and their legal equivalents. Those having an ordinary skill in the will envision other possible variations and modifications to features and/or elements of the embodiments, and they will envision other possible embodiments, all of which may fall within the spirit and scope of the attached claims. The spirit and scope of the attached claims is therefore NOT limited by the descriptions and illuminations of the embodiments that have already been presented, but rather the spirit and scope can only be defined by the attached claims and their legal equivalents as interpreted under the doctrine of equivalents. Variations, alternatives, adjustments, modifications, tunings, and deviations from the embodiments of the instant disclosure are fully contemplated and envisioned within the spirit and scope of the attached claims.

What is claimed is:

1. A low profile mounting assembly comprising:
   a metal structural member for mounting to a concrete structure and including an outer face and at least one countersunk bore formed therethrough;
   a screw including a head with a flat top, and said screw being structured and disposed for passage through the countersunk bore of the metal structural member and into the concrete structure for fastening the metal structural member to the concrete structure, and the countersunk bore and the screw head being congruently sized and configured for seated receipt of the screw head within the countersunk bore so that the flat top of the screw head is flush with the outer face of the metal structural member;
   a screw cover having a concave inner surface and an oppositely disposed convex outer surface and a peripheral edge surrounding the concave inner surface and being structured and disposed for mating engagement with the outer face surrounding the countersunk bore of the metal structural member, and the screw cover further having a cavity defined by an entire space between a plane of the peripheral edge and the concave inner surface;
   a charge of water resistant adhesive completely filling the cavity of the screw cover, and the charge of adhesive serving to adhere the screw cover to the flat top of the screw and the outer face of the structural member surrounding the countersunk bore to conceal the screw head from view and seal the screw and countersunk bore from exposure to moisture; and
   the convex outer surface of the screw cover having a color that matches a color of the outer face of the metal structural member to thereby reduce visibility of the screw cover.

2. The low profile mounting assembly as recited in claim 1 wherein the edge of the screw cover is a circular edge.

3. The low profile mounting assembly as recited in claim 2 wherein the charge of water resistant adhesive is a charge of silicone adhesive.

* * * * *